Patented Feb. 9, 1937

2,070,213

UNITED STATES PATENT OFFICE 2,070,213

METHOD OF MAKING WHITE LEAD PIGMENT

Thomas A. Mitchell, Denver, Colo., assignor to Hughes-Mitchell Processes, Incorporated, Denver, Colo., a corporation of Wyoming No Drawing. Application October 25, 1934, Serial No. 750,018

6 Claims. (Cl. 23—71)

This invention relates to the manufacture of white lead and more particularly to a method of producing the same from lead chloride.

One common procedure for making white lead has involved the expensive process of forming metallic lead and then lead oxide from a lead ore and thereafter converting the lead oxide to the basic lead carbonate of required composition. In accordance with the present process, it is proposed to form the basic lead carbonate from lead chloride which may, if desired, be derived directly from a lead ore without the necessity for going through the intermediate metallic and oxide stages in the formation of the pigment.

The primary objects of this invention are to provide a simple, efficient and economical method of converting lead chloride to white lead and to produce a white lead of a controlled composition which will have desired pigmentive properties. Other objects will be apparent in the following disclosure.

In accordance with this invention, lead chloride may be treated in a substantially dry or crystalline condition with concentrated caustic soda to obtain a basic lead chloride or lead hydroxychloride having the composition of $2PbCl_2.Pb(OH)_2$. The latter is then treated with a hot salt brine under 84° C. to dissolve its soluble content, after which sufficient sodium carbonate in solution is added to the pulp to form the desired white lead. In this process, potassium hydroxide and carbonate are the equivalents of the corresponding sodium salts, which are herein classified as alkali metal compounds.

The lead chloride may be obtained as a crystalline product by means of the standard hot salt brine method of extracting lead chloride from an ore residue, in which the lead is present as either lead sulfate or lead chloride. The lead-bearing brine may be suitably purified, if undesired ingredients are present. Upon cooling the hot sodium chloride brine containing the lead, sodium and chlorine ions, with or without sulfate ions, a complex lead sodium chloride salt crystallizes out and may be readily separated from the brine. This salt, herein termed "lead chloride", is considered to have the formula $xPbCl_2.yNaCl$. Likewise, lead chloride crystals free from sodium chloride may be employed as the initial source of lead for the reactions. The presence of the sodium chloride, whether free or combined with lead in the crystals, will not interfere materially with the reactions, as will be readily apparent.

In this process, refined lead chloride crystals are treated with caustic soda or potash, which is preferably in a concentrated aqueous solution, while the material is continuously heated to a temperature sufficiently high to remove any water which may be present. It is desirable to keep the mass in a pasty or semi-dry and neutral condition throughout this stage of the process. For this purpose, the lead chloride crystals may be initially crushed to a size of 80 meshes to the linear inch or finer in order to expedite the reaction. These crystals may be placed in a suitable kettle, such as one lined with porcelain, and the material may be heated sufficiently to evaporate the water, and the temperature may be maintained constant at a required point by means of a heated oil bath.

The sodium or potassium hydroxide may be used as an aqueous solution of suitable strength but preferably of high concentration, such as a 40 M solution. The solution is added slowly while the crystals are agitated and stirred; and the rate of adding the caustic solution is such that the paste is of low alkalinity or does not show an alkaline reaction at any time in the process. This rate should also be such that the mixture becomes pasty as the reaction goes on but not highly fluid, and so that it does not change color, as is the case when an excess of caustic soda is used. By this procedure, sufficient alkali metal hydroxide is added to produce the correct amount of hydroxyl in the lead hydroxychloride of the formula $2PbCl_2.Pb(OH)_2$, as is required for making the white lead. By heating this substantially dry mixture as the hydroxl part of the molecule is being formed, the material is constantly shrunk and the physical condition of the material is thus improved.

The second stage of the process requires converting the chlorine content of the material to a carbonate. To this end, the paste of lead hydroxychloride is treated with a hot aqueous solution of sodium chloride, or potassium chloride, if desired, in order to dissolve any residual lead chloride as well as other soluble content of the material. Any lead hydrate present does not dissolve. The sodium chloride brine is heated to a point under 84° C. but preferably above 75° C. Then, the hot pulp of salt brine and its suspended material is treated with sodium or potassium carbonate solution, which is molecularly proportioned or present in amount sufficient to change all of the lead chloride content of the pulp to the carbonate and thus produce a basic lead carbonate. Since the lead carbonate portion of the white lead is formed in the presence of the lead hydrate, they are presumed to combine to form the molecular structure of white lead. The product may then be separated from the solution, dried and disintegrated or otherwise treated to prepare it for use as a pigment. A typical white lead obtained in accordance with this process may analyze as follows:

| | |
|---|---|
| $PbCO_3$ | 70.31 |
| $Pb(OH)_2$ | 29.66 |
| Ratio | 2.37 |

The treatment of the lead chloride crystals with the caustic soda or potash may be continued so as to transform a predetermined portion of the lead chloride to lead hydrate, so that the ratio of lead hydrate to lead carbonate in the pigment may be adjusted to impart to the white lead such pigmentive properties as may be required. A slight excess of hydrate is considered to increase the tinting strength of some paints as well as the content of lead soap in the paint, which gives the paint more resiliency and hinders cracking thereof. Similarly, a slight excess of carbonate over the molecular ratio may be produced if desired. This control of chemical composition is readily accomplished by properly proportioning the reagents employed. It will thus be apparent that the process is flexible and may be readily controlled to give the particular chemical composition and the pigmentive properties which are desired and particularly a pigment of a controlled or low oil absorption.

Having thus described the invention, what is claimed as new and desired to secure by Letters Patent is:

1. The method of making white lead comprising the steps of treating crystalline lead chloride with a strong aqueous solution of alkali metal hydroxide under conditions which produce a paste of lead hydroxychloride, suspending the paste in a hot aqueous alkali metal chloride brine and adding alkali metal carbonate thereto in amount required to form basic lead carbonate.

2. The method of making white lead comprising the steps of treating crystalline lead chloride with a strong aqueous solution of alkali metal hydroxide while heating the same and evaporating the water to produce a paste of lead hydroxychloride, suspending the paste in a hot aqueous alkali metal chloride brine and adding to the mixture an alkali metal carbonate in amount required to form basic lead carbonate.

3. The method according to claim 2 in which a strong solution of alkali metal hydroxide is added slowly to a batch of lead chloride crystals and at such a rate that the mass is of zero or low alkalinity during the step of forming lead hydroxychloride.

4. The method according to claim 2 in which a definite quantity of a strong solution of alkali metal hydroxide is added at such a rate to a batch of lead chloride crystals that the mass has zero or low alkalinity during the reaction and lead hydroxychloride of required composition is produced.

5. The method of making white lead pigment comprising the steps of treating crystalline lead chloride with a strong aqueous solution of caustic soda while heating the mass to evaporate the water and produce a paste of zero or low alkalinity having a required composition of approximately $2PbCl_2.Pb(OH)_2$, thereafter suspending the paste in a hot aqueous solution of sodium chloride and dissolving its soluble chloride content therein, and then adding sodium carbonate to the mixture in amount required to form white lead of required composition.

6. The method of claim 5 in which the lead chloride comprises the product derived by extracting lead from an ore material containing lead chloride or sulfate by leaching the same with a hot aqueous solution of sodium chloride and thereafter cooling the solution and crystallizing lead chloride therefrom.

THOMAS A. MITCHELL.